(12) United States Patent
Lasmanis

(10) Patent No.: US 12,550,872 B2
(45) Date of Patent: Feb. 17, 2026

(54) BIRD PERCH MOUNTED TO MONITOR

(71) Applicant: Mark Lasmanis, Willowick, OH (US)

(72) Inventor: Mark Lasmanis, Willowick, OH (US)

( * ) Notice: Subject to any disclaimer, the term of this patent is extended or adjusted under 35 U.S.C. 154(b) by 2 days.

(21) Appl. No.: 18/583,768

(22) Filed: Feb. 21, 2024

(65) Prior Publication Data

US 2025/0261619 A1 Aug. 21, 2025

(51) Int. Cl.
*A01K 31/12* (2006.01)
(52) U.S. Cl.
CPC ................................. *A01K 31/12* (2013.01)
(58) Field of Classification Search
CPC ...................................................... A01K 31/12
USPC .................... 119/531, 537, 468, 57.8, 702
See application file for complete search history.

(56) References Cited

U.S. PATENT DOCUMENTS

| | | | | |
|---|---|---|---|---|
| 1,598,159 A * | 8/1926 | Skinner | ................. | A01K 31/12 |
| 1,870,125 A * | 8/1932 | Kolstad | ................. | A01K 31/12 |
| 5,381,758 A * | 1/1995 | Simon | ................. | A01K 31/12 |
| | | | | 119/26 |
| 5,875,902 A * | 3/1999 | Emery | ................. | A47F 5/00 |
| | | | | 211/90.03 |
| 6,390,729 B1 * | 5/2002 | Dooley | ................. | E02B 3/06 |
| | | | | 405/29 |
| 2005/0263094 A1 * | 12/2005 | Goodger | ................. | A01K 31/12 |
| | | | | 119/537 |
| 2013/0284100 A1 * | 10/2013 | MacKelvie | ................. | A01K 39/01 |

\* cited by examiner

*Primary Examiner* — Joshua J Michener
*Assistant Examiner* — Henry Hooper Mudd
(74) *Attorney, Agent, or Firm* — Daniel M. Cohn; Howard M. Cohn

(57) ABSTRACT

A bird perch that removably mounts to a panel. The bird perch includes a rail system including an upper rail and two outer rails. Each of the outer rails are connected by first and second curved supports to the upper rail. Two changeable, protective inserts supported in the first and second curved supports and easily removed for fast clean up.

20 Claims, 11 Drawing Sheets

BIRD PERCH MOUNTED TO MONITOR

TECHNICAL FIELD OF THE INVENTION

The present invention relates generally to a bird perch and more particularly to a bird perch mounted to a monitor.

BACKGROUND OF THE INVENTION

Conventional bird perches are typically mounted outside to provide wild birds bird food with many ordinary conveniences including squirrel traps and water containers. However, some users have birds inside their home and require a bird feeder conveniently placed.

Bird perches are usually permanently affixed to bird houses or cages, or free-standing permanent stands. Some are designed for attachment to other objects, such as golf carts, etc., or include attachments such as bird dropping trays, along with a suction cup for attaching to a solid wall, mirror or the like. There appears to be no known portable bird perch which is completely collapsible quickly, so that the bird owner can collapse the bird perch quickly into a convenient size for carrying, to facilitate relocating the bird handily from one place to another, such as taking the bird from the owner's home to someone else's home, or to the office, or outdoors, or from room-to-room within the home, and the like: And upon arrival at the new place, the bird perch can be quickly assembled in a few seconds.

SUMMARY OF THE INVENTION

According to the present invention, a bird perch that removably mounts to a panel. The bird perch includes a rail system including an upper rail and two outer rails. Each of the outer rails are connected by first and second curved supports to the upper rail. Two changeable, protective inserts supported in the first and second curved supports and easily removed for fast clean up.

Further according to the present invention, a bird perch that removably mounts to a panel, comprises a rail system including an upper rail and two outer rails. Each of the outer rails are connected by first and second curved support to the upper rail. Two changeable, protective inserts supported in the first and second curved supports and gripped by the upper rail and two outer rails. The two changeable, protective inserts being easily removed for fast clean up.

BRIEF DESCRIPTION OF DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

Figure 1:
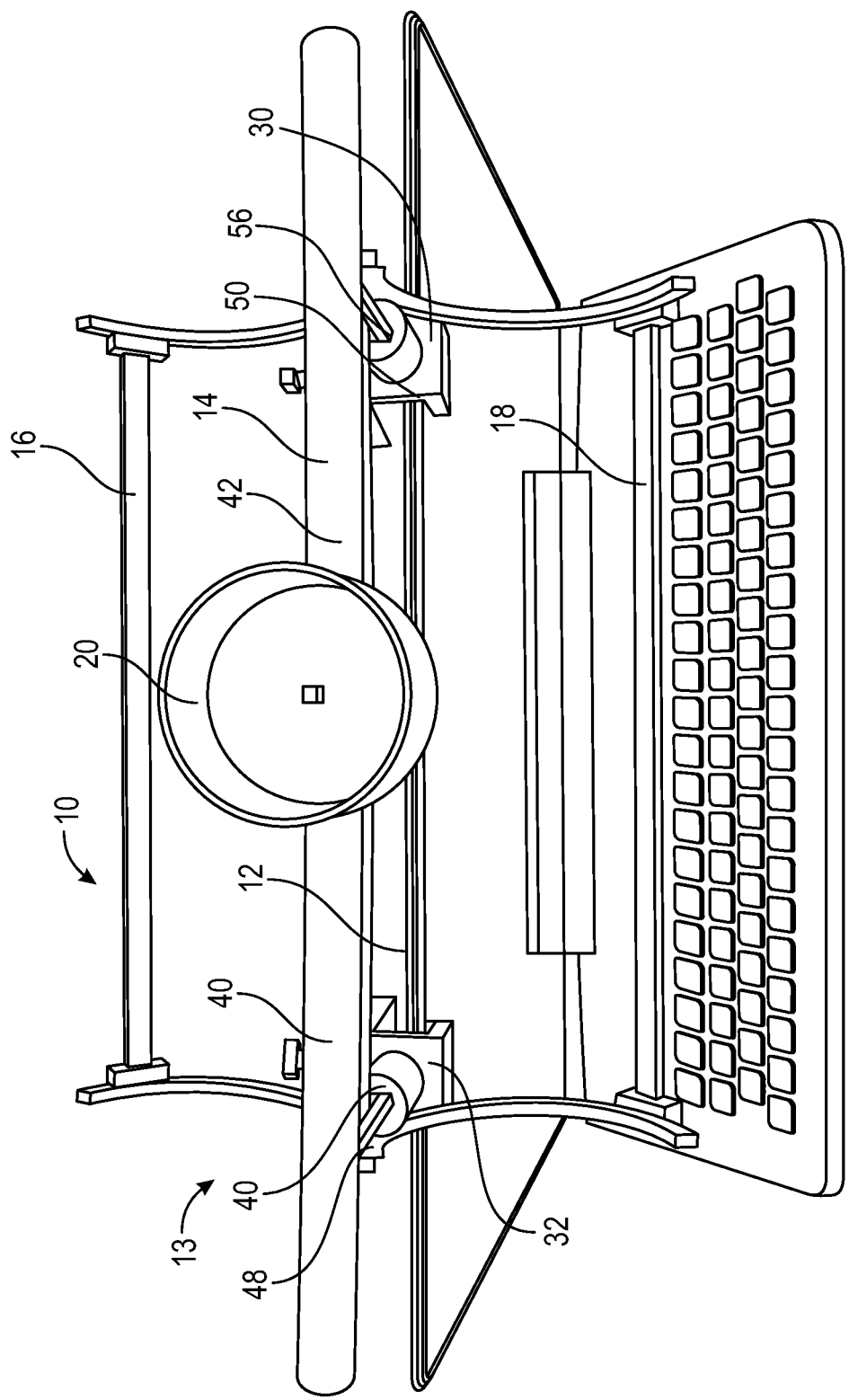
FIG. 1 is a top, three-dimensional view of a bird perch mounted to a laptop panel, in accordance with the present invention.

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Figure 2:
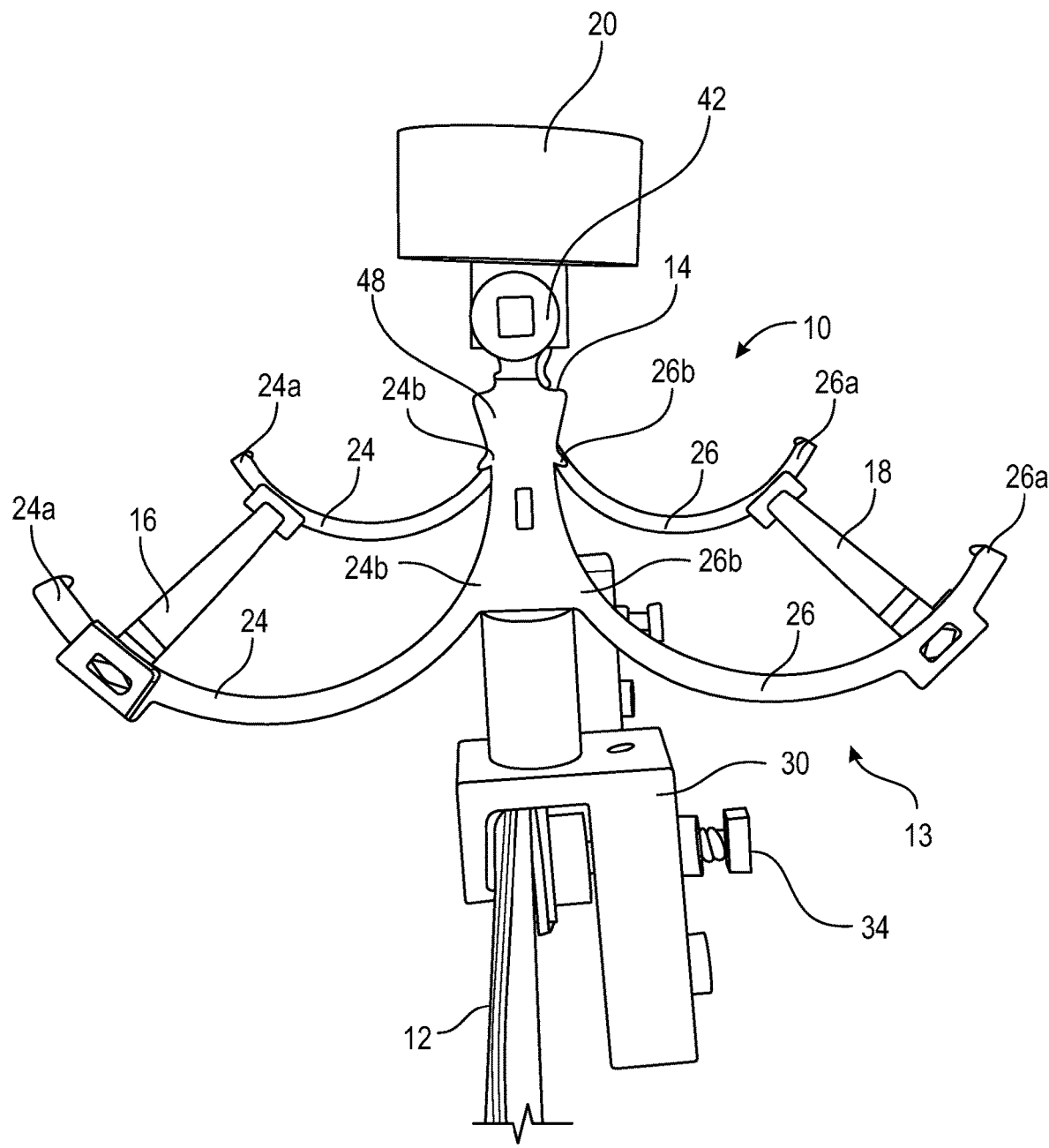
FIG. 2 is an end, three-dimensional view of the bird perch of FIG. 1 mounted to a laptop panel, in accordance with the present invention.

Referring to FIG. 1, there is illustrated a bird perch 10 that mounts to a laptop 12, or panel monitors, TVs, and interchangeable panels for easy clean up and customization. The bird perch 10 can also be used as a rail system 13 as shown in FIGS. 1, 2 and 3 with top rail 14 and bottom rails 16 and 18 for different uses, such as mounting on a stand or tripod, supporting a treat bowl or toys 20, and/or a divider to separate birds that squabble with each other.

The bird perch 10 provides a convenient place for one or more birds to socialize while protecting the electronics on which the perch is mounted. The bird perch 10 of the present invention protects the screen or panel 12 of laptops and similar displays to which the perch is mounted.

The bird perch 10 is multipurpose, mountable and can be mounted to a number of supports such as to a tripod to provide traditional short or tall perches. It is also possible for the bird perch 10 to be hangable.

Figure 3:
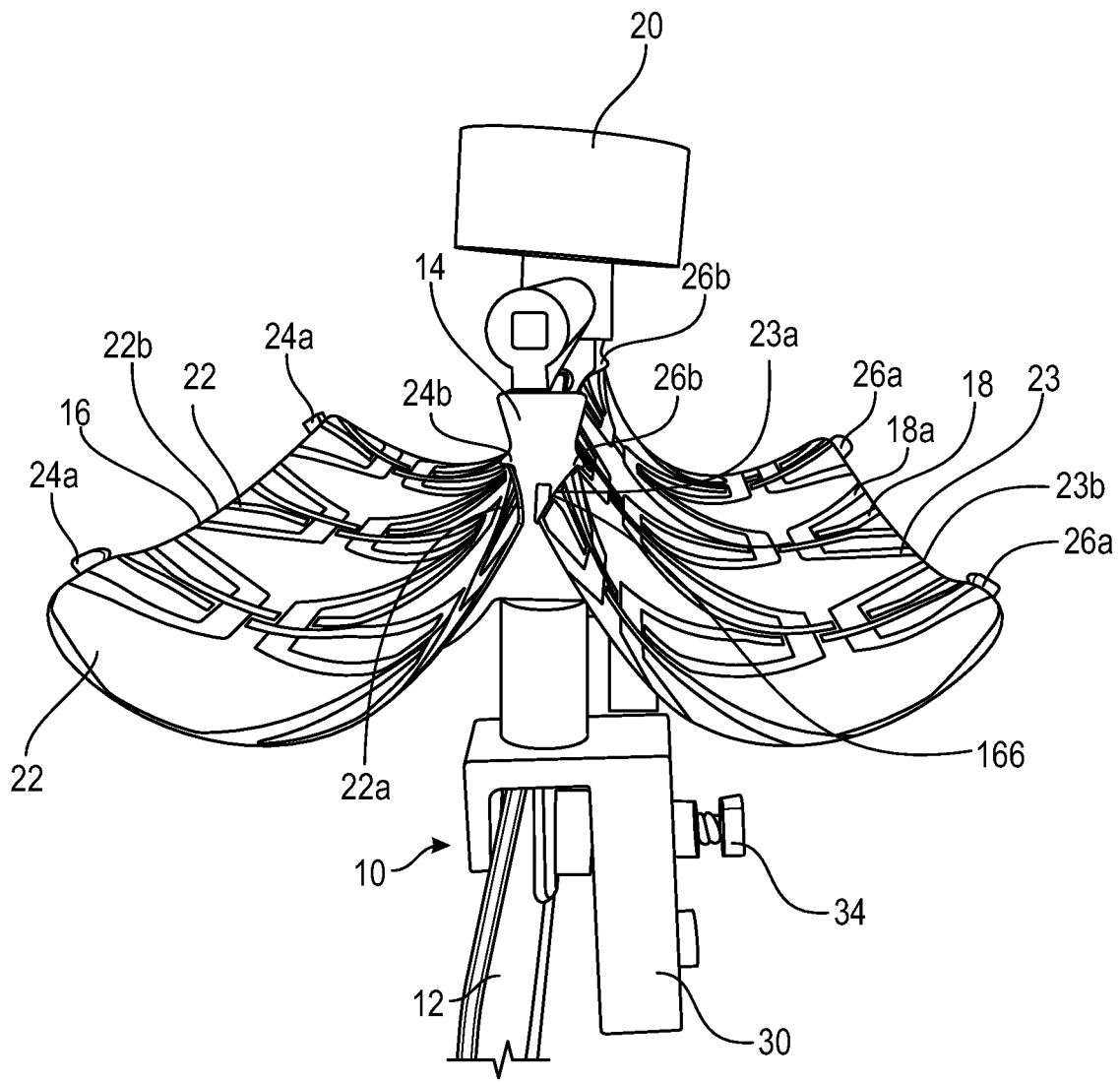
FIG. 3 is an end, three-dimensional view of the bird perch of FIG. 1 mounted to a laptop panel and having troft inserts secured to either side of the bird perch, in accordance with the present invention.

As shown in FIG. 3, the bird perch 10 can include two changeable protective inserts 22 and 23 which can be easily removed for fast clean up. The two protective inserts 22 and 23 can be constructed of a stiff material, such as paper or plastic, and shaped to be the length of the bird perch 10 and formed with a curvature so as to be mounted between the upper rail 14 and the two outer rails 16 and 18 as shown in FIG. 3.

Each of the outer rails 16 and 18 are connected by the inner end of a pair of curved supports 24 and 26 to the upper rail 14. The outer ends of the curved supports 24 and 26 each have an outer protrusion 24a and 26a, respectively, and the inner ends of the curved supports 24 and 26 each have an inner protrusion 24b and 26b. The elongated inner edges 22a and 23a of the protective inserts 22 and 23, respectively, are gripped by the inner protrusion 24b and 26b and the elongated outer edges 22b and 23b of the protective inserts 22 and 23, respectively, are gripped by the outer protrusions 24a and 26a, respectively. The protective inserts 22 and 23 can be easily replaced.

Figure 4:
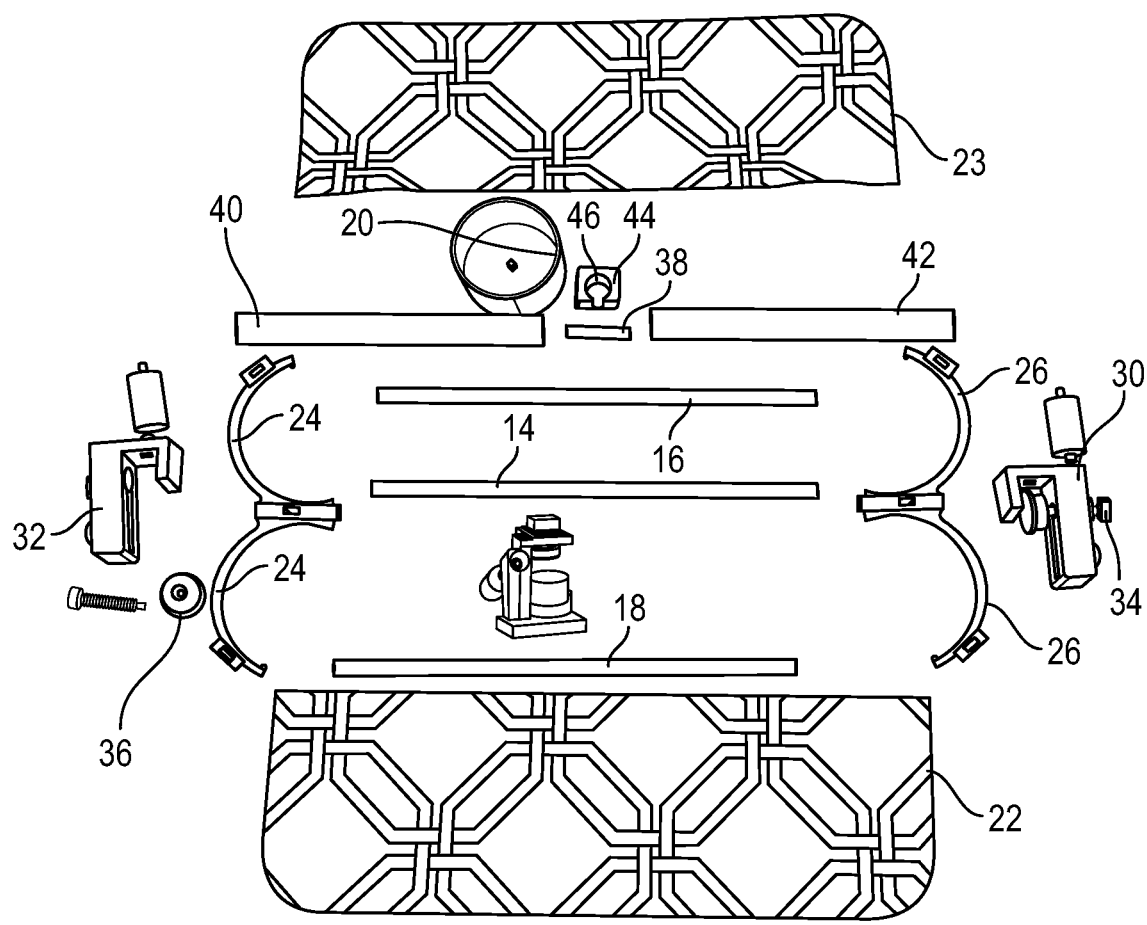
FIG. 4 is a top, exploded view of the parts used to construct the bird perch of FIG. 3 adapted to mount to a laptop panel, in accordance with the present invention.

Referring to FIG. 4, the bird perch 10 is mounted to a computer screen 12 by clamps 30 and 32. A bolt 34 and 36, as shown in FIG. 4, is mounted to the clamps 30 and 32 to secure them to the screen 12. A rod 38 interconnects two elongated cylindrical rods 40 and 42. A support 44 having an opening 46 therethrough is mounted to the rod 38 and is attached to the bowl 20. The ends of the cylindrical rods 40 and 42 are affixed to the ends 48 and 50 of the perch 10 as shown in FIG. 1.

Figure 5:
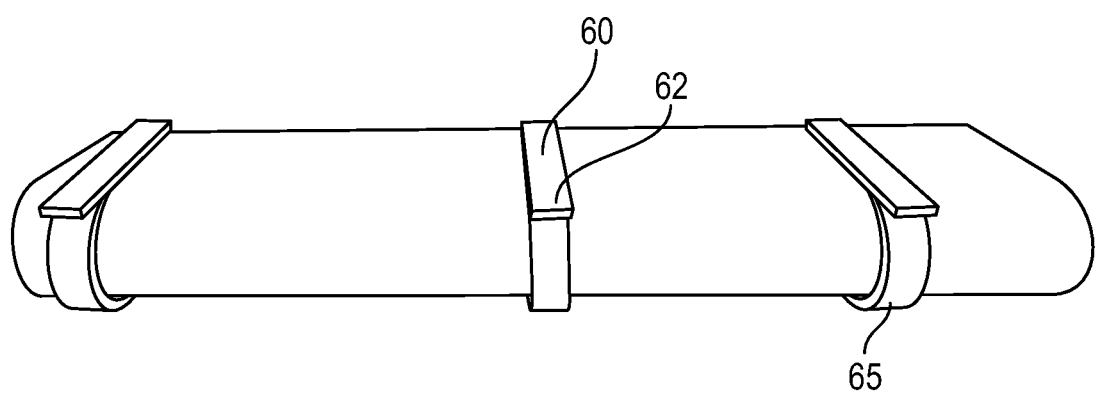
FIG. 5 is a bottom, three-dimensional view of a paper troft, in accordance with the present invention.
Figure 6:
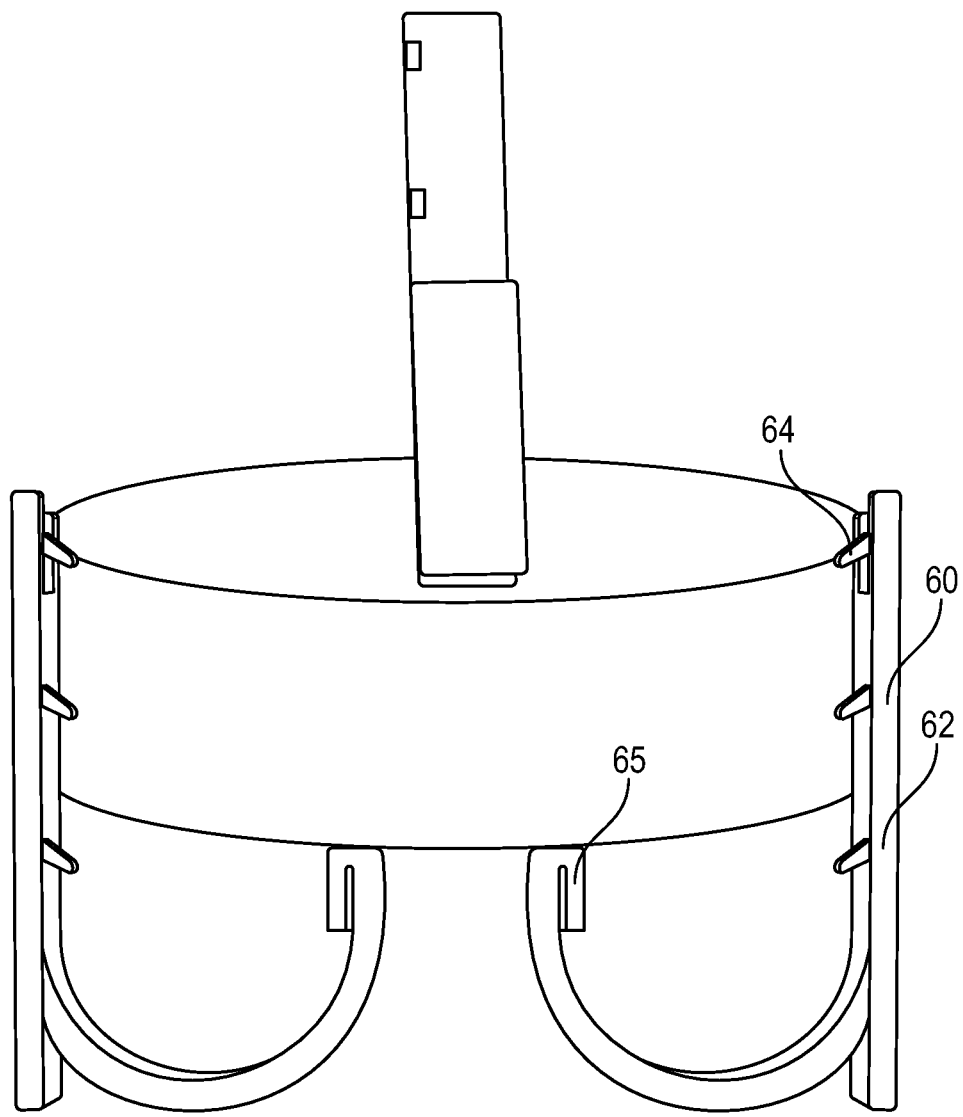
FIG. 6 is a front, three-dimensional view of a paper troft, in accordance with the present invention.
Figure 7:
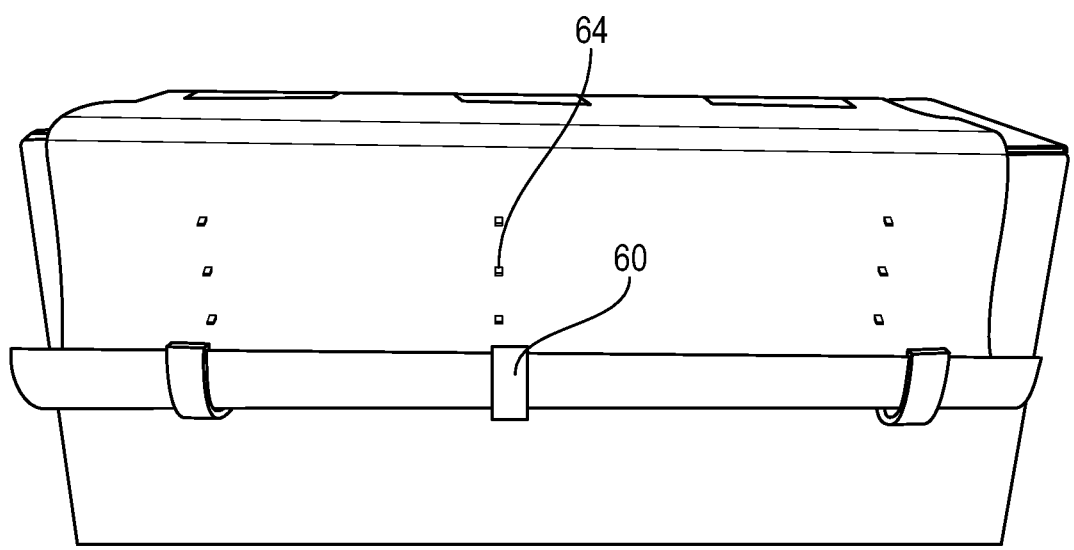
FIG. 7 is a rear, three-dimensional view of paper secured to a paper troft, in accordance with the present invention.

In another embodiment of the invention, as shown in FIGS. 5 and 6, a paper troft clip 60 allows any old papers to be turned into a disposable troft for doors and overhangs. The troft has a side wall 62 with a plurality of protrusions 64 protruding therefrom and which can protrude into the paper of the troft as shown in FIG. 7. The opposite end 65 of the side wall is curved to receive paper. The paper troft clip may be a bonus accessory to mount to doors, overhangs, refrigerators and other household items. It's also useful for hobbies, crafts and for tables that need to be easily cleaned up.

Figure 8:
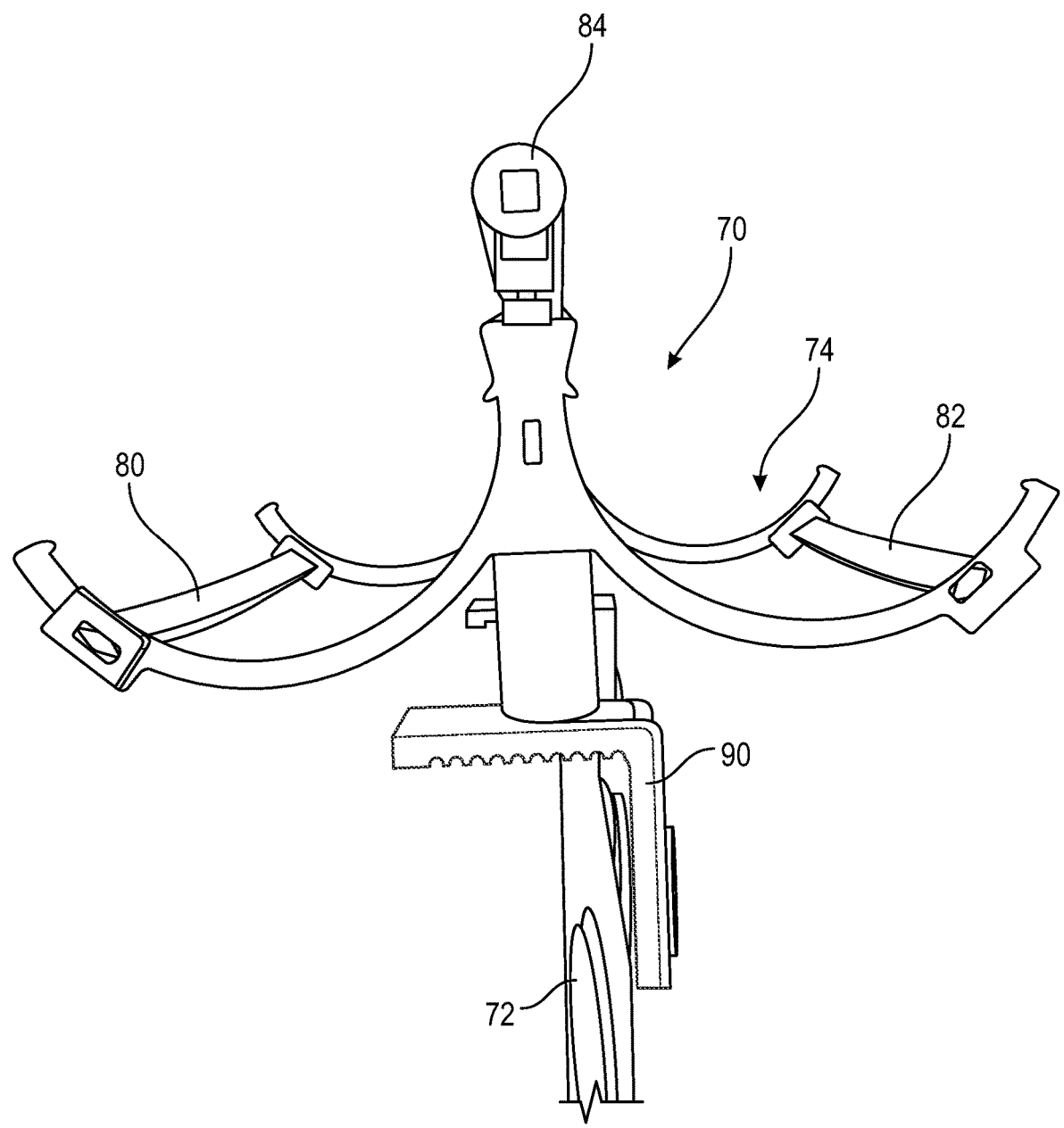
FIG. 8 is an end, three-dimensional view of a bird perch mounted by magnets to a laptop panel, in accordance with the present invention.
Figure 9:
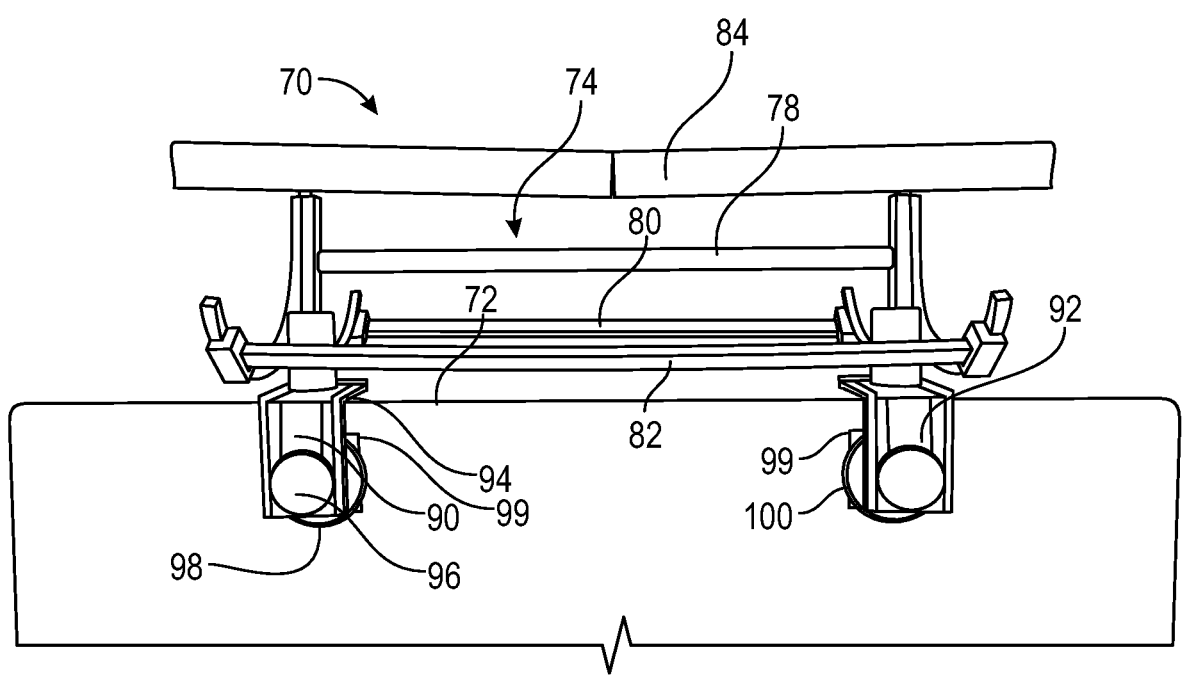
FIG. 9 is a side, three-dimensional view of the bird perch of FIG. 8 mounted by magnets to a laptop panel, in accordance with the present invention.
Figure 10:
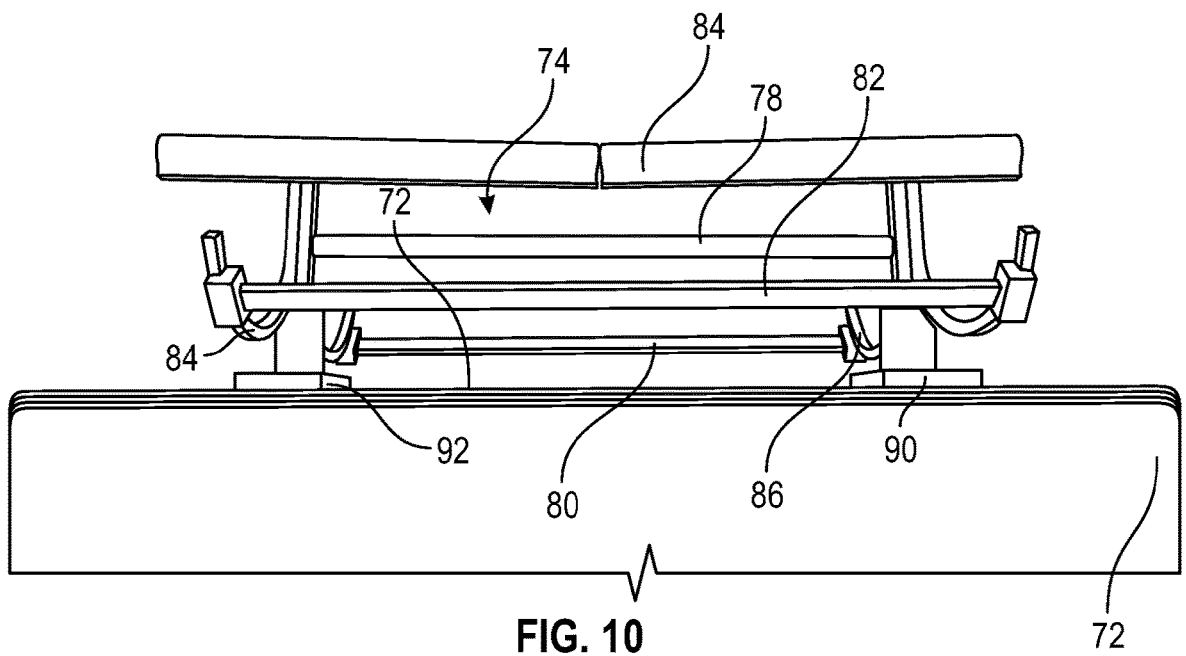
FIG. 10 is a side, three-dimensional view of the bird perch of FIG. 8 mounted by magnets to a laptop panel, in accordance with the present invention.

Referring to FIG. 8, there is illustrated another embodiment of the present invention where the perch 70 also mounts to a laptop 72, or panel monitors, TVs, and interchangeable panels for easy clean up and customization. The bird perch 70 can also be used as a rail system 74 as shown in FIGS. 8, 9 and 10 with top and bottom rails 78, 80 and 82 for different uses, such as mounting on a stand or tripod, supporting a treat bowl or toys, and/or a divider 84 to separate birds that squabble with each other.

The bird perch 70 provides a convenient place for one or more birds to socialize while protecting the electronics on which the perch is mounted. The bird perch 70 of the present invention protects the screen or panel of laptops 72 and similar displays to which the perch is mounted.

The bird perch 70 is multipurpose, mountable and can be mounted to a number of supports such as to a tripod to provide traditional short or tall perches. It is also possible for the perch to be hangable.

As shown in FIG. 3, the perch 70 can include two changeable protective inserts, compare 22 and 23, which can be easily removed for fast clean up. The two protective inserts 22 and 23 can be constructed of a stiff material, such as paper or plastic, and shaped to be the length of the perch 70 and formed with a curvature so as to be mounted between the upper rail 14 and the two outer rails 16 and 18 as shown in FIG. 3.

Each of the outer rails 78 and 82 are connected by the inner end of a pair of curved supports (compare 24 and 26) to the upper rail 14. The outer ends of the curved supports 84 and 86 each have an outer protrusion (compare 24a and 26a) and the inner ends of the curved supports (compare 24 and 26) each have an inner protrusion (compare 24b and 26b). The elongated inner edges (compare 22a and 23a) of the protective inserts 22 and 23 are gripped by the inner protrusion (compare 24b and 26b) and the elongated outer edges (compare 22b and 23b) of the protective inserts 22 and 23 are gripped by the outer protrusions (compare 24a and 26a), respectively. The protective inserts 22 and 23 can be easily replaced.

Figure 11:
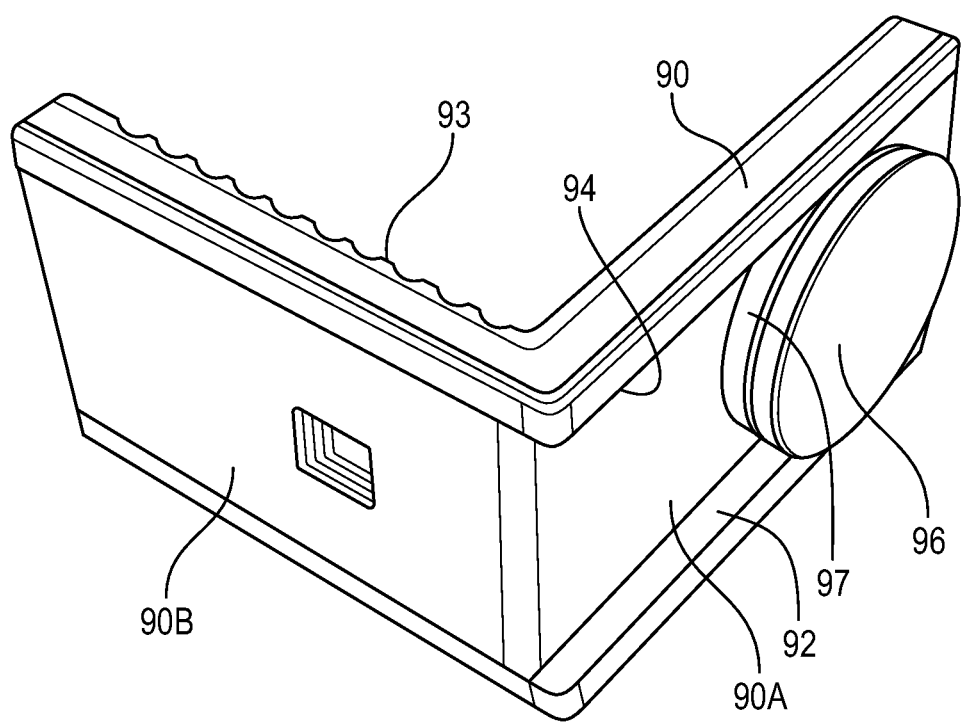
FIG. 11 is a three-dimensional view of a clamp with magnets for mounting the bird perch of FIG. 8 to a laptop panel, in accordance with the present invention.

Referring to FIGS. 8 and 9, the bird perch 70 is mounted to a computer screen 72 by magnetic clamps 90 and 92. Each of the magnetic clamps 90 and 92 are L shaped and have one surface with ribs or serrations 93, as shown in FIG. 11, that rest against the upper surface of the screen 72. The L shaped magnetic clamps 90 and 92 can have surfaces 90A and 90B which are perpendicular to each other. The surface 90A can have upstanding sidewalls 92 and 94 which project up from the flat surface 90A and engage the sides 97 of the circular magnet 96. The circular magnet 96 can magnetically attach to a metal plate 98 which can be mounted to the computer screen 72 by adhesive means 99 such as a strip of adhesive such as glue, cement or paste. The magnet 96 can move in the channel formed between the surface 90A and the walls 92 and 94 so that the magnetic clamps are aligned for the greatest magnetic. The ribs or serrations 93 maybe rubber to help grip to the bezel edge of the screen or to provide extra friction for other large flat surfaces. The circular magnet 96 is mounted to the L shaped clamp through the side which is free of serrations. The The L shaped clamps 90 and 92 can be secured to the circular magnets or metal plates 98 and 100 so that the bird perch 70 can be quickly installed and removed as desired. The circular magnets 96 can include a slotted channel whereby the magnets can move freely to self-adjust.

The collapsible bird perch 10 is convenient for easy packaging and assembly by the end user. The bird perch 10 includes easily removable, interchangeable replaceable panels which provides easy cleanup and the ability to provide custom art work. The rails can be used to adjust the position of the accessories.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A bird perch that removably mounts to a panel, comprising:
    a rail system including an upper rail and two outer rails;
    each of the outer rails are connected by first and second curved supports to the upper rail, outer ends of the first and second curved supports each have an outer protrusion, inner ends of the first and second curved supports each have an inner protrusion;
    two changeable, protective inserts supported in the first and second curved supports;
    wherein the first and second protective inserts are gripped by the inner protrusions at the inner ends of the first and second curved supports.

2. The bird perch of claim 1 wherein first and second protective inserts are gripped by the upper rail and two outer rails.

3. The bird perch of claim 2 wherein the first and second protective inserts each have elongated outer edges and elongated inner edges.

4. The bird perch of claim 3 wherein the first and second protective inserts are constructed of a material selected from the group comprising paper and plastic.

5. The bird perch of claim 3 wherein the first and second protective inserts are shaped to be the length of the bird perch and formed with a curvature so as to be mounted between the upper rail and the two outer rails.

6. The bird perch of claim 1 wherein the first and second protective inserts are gripped by the outer protrusions at the outer ends of the first and second curved supports.

7. The bird perch of claim 6 wherein the perch is mounted to a panel by clamps.

8. The bird perch of claim 7 wherein the bird perch is mounted to a computer screen by clamps.

9. The bird perch of claim 8 wherein the bird perch is mounted to a computer screen by magnetic clamps.

10. The bird perch of claim 9 wherein each of the magnetic clamps is L shaped and have one surface with serrations that rest against an upper surface of the computer screen.

11. The bird perch of claim 10 wherein two a ferromagnetic metal plates are mounted to the surface of the computer screen by means including an adhesive.

12. The bird perch of claim 11 wherein magnets inside the L shaped clamp allow it to be secured to the ferromagnetic metal plates so that the perch can be quickly installed and removed as desired.

13. The bird perch of claim 1 wherein the rail system is mounted to a stand supporting a treat bowl, toys, and a divider to separate birds that squabble with each other.

14. A bird perch that removably mounts to a panel, comprising:
    a rail system including an upper rail and two outer rails;
    each of the outer rails are connected by first and second curved support to the upper rail, outer ends of the first and second curved supports each have an outer protrusion, inner ends of the first and second curved supports each have an inner protrusion;
    two changeable, protective inserts supported in the first and second curved supports and gripped by the upper rail and two outer rails;
    wherein the first and second protective inserts are gripped by the inner protrusions at the inner ends of the first and second curved supports.

15. The bird perch of claim 14 wherein first and second protective inserts each have elongated outer edges and elongated inner edges that are gripped by the upper rail and two outer rails.

16. The bird perch of claim 15 wherein the bird perch is mounted to a computer screen by clamps.

17. The bird perch of claim 14 wherein the bird perch is mounted to a computer screen by magnetic clamps, wherein each of the magnetic clamps is L shaped and have one surface with serrations that rest against an upper surface of the computer screen.

18. A bird perch that removably mounts to a panel, comprising:
    a rail system including an upper rail and two outer rails;
    each of the outer rails are connected by first and second curved supports to the upper rail;
    two changeable, protective inserts supported in the first and second curved supports;
    wherein the bird perch is mounted to a computer screen by magnetic clamps;
    wherein each of the magnetic clamps is L shaped and have one surface with serrations that rest against an upper surface of the computer screen.

19. The bird perch of claim 18 wherein two a ferromagnetic metal plates are mounted to the surface of the computer screen by means including an adhesive.

20. The bird perch of claim 19 wherein magnets inside the L shaped clamp allow it to be secured to the ferromagnetic metal plates so that the perch can be quickly installed and removed as desired.

* * * * *